(No Model.)

W. MURON.
PULLEY.

No. 495,749.   Patented Apr. 18, 1893.

WITNESSES:
Henry J. Miller
M. F. Bligh

INVENTOR:
William Muron,
by Joseph A. Miller & Co.,
Att'ys.

UNITED STATES PATENT OFFICE.

WILLIAM MURON, OF WOONSOCKET, RHODE ISLAND.

PULLEY.

SPECIFICATION forming part of Letters Patent No. 495,749, dated April 18, 1893.

Application filed March 7, 1893. Serial No. 464,994. (No model.)

*To all whom it may concern:*

Be it known that I, WILLIAM MURON, of Woonsocket, in the county of Providence and State of Rhode Island, have invented certain new and useful Improvements in Pulleys; and I hereby declare that the following is a full, clear, and exact description of the same, reference being had to the accompanying drawings, forming part of this specification.

This invention has reference to improvements in swiveled-pulleys.

The object of the invention is to produce a pulley having a peculiarly swiveled-shank to allow the pulley to automatically turn in any direction.

The further object of the invention is to produce a swiveled-pulley having a securing-plate which is adapted to be secured in a vertical, or horizontal, plane or on an angle between the two, without interfering with the free movement of the pulley.

The invention consists in certain peculiar features of construction and combination of parts which will hereinafter be more fully described and pointed out in the claim.

Figure 1:
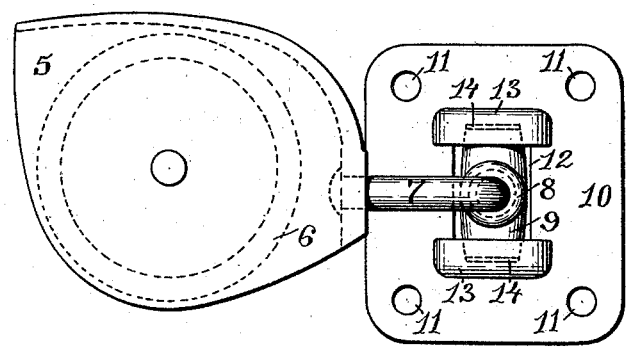
Figure 2:
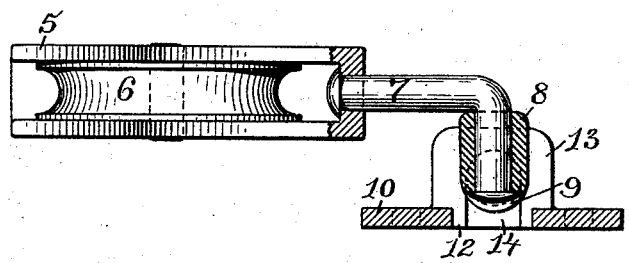

Figure 1 represents a top view of the improved pulley when in a horizontal-plane. Fig. 2 represents a side view of the same, partly in section, to more clearly show the construction.

Similar numbers of reference designate corresponding parts throughout.

In carrying my invention into effect I form a pulley-frame, or hood, 5 preferably closed at one edge for the better protection of the pulley-sheave 6 which is rotatable on a shaft riveted through the sides, the closed edge of the frame 5 curves around the back of the pulley-sheave, as indicated in dotted lines in Fig. 1, and is perforated, the bent shank 7 extends through this perforation and is riveted within the pulley-frame which is free to rotate on the shank, the rear bent-end of the shank being journaled in a sleeve 8 of the cross-bar 9 and secured by riveting the end as is shown in Fig. 2. The securing-plate 10 is perforated at the corners as 11—11 to allow the passage of securing-screws, and has a central opening 12 at each end of which is located a member 13 having a slotted-bearing 14 formed in its inner surface, the ends of the cross-bar 9 are mounted in these bearings in which they are free to partially rotate. It is obvious that when the plate 10 is secured in either a vertical, or horizontal, plane the pulley-frame 5 is free to rotate on the shank 7 while the shank 7 and the cross-bar 9 are capable of partially independent rotation,— by this means the pulley is adjusted to a strain in any direction away from the plate 10.

Having thus described my invention, I claim as new and desire to secure by Letters Patent—

The combination with the pulley-frame 5 having a closed rear-portion suitably perforated, and the pulley-sheave 6 journaled on a shaft secured in the sides of the pulley-frame, of the bent-shank 7 extending through the perforation at the rear of the pulley-frame and secured therein, the sleeve 8 in which the other end of the shank 7 is journaled and secured, the cross-bar 9 formed in part with this sleeve, and the securing-plate 10 having the central-opening 12, and the members 13—13 provided with bearings 14—14 in which the ends of the cross-bar 9 are journaled, as and for the purpose described.

WILLIAM MURON.

Witnesses:
I. ED. NOLETTE,
HENRY J. MILLER.